(12) United States Patent
Zha

(10) Patent No.: US 10,058,777 B2
(45) Date of Patent: Aug. 28, 2018

(54) TASK EXECUTION METHOD, APPARATUS AND SYSTEM

(71) Applicant: Tencent Technology (Shenzhen) Company Limited, Shenzhen (CN)

(72) Inventor: Wen Zha, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 535 days.

(21) Appl. No.: 14/460,251

(22) Filed: Aug. 14, 2014

(65) Prior Publication Data

US 2015/0141150 A1 May 21, 2015

Related U.S. Application Data

(63) Continuation of application No. PCT/CN2014/077793, filed on May 19, 2014.

(30) Foreign Application Priority Data

Nov. 21, 2013 (CN) .......................... 2013 1 0591483

(51) Int. Cl.
*A63F 13/35* (2014.01)
*A63F 13/30* (2014.01)
(Continued)

(52) U.S. Cl.
CPC .............. *A63F 13/30* (2014.09); *A63F 13/70* (2014.09); *H04L 67/2809* (2013.01);
(Continued)

(58) Field of Classification Search
None
See application file for complete search history.

(56) References Cited

U.S. PATENT DOCUMENTS

| 4,426,681 A | 1/1984 | Bacot et al. |
| 8,303,416 B1 * | 11/2012 | Thakkar ................. A63F 13/12 463/42 |

(Continued)

FOREIGN PATENT DOCUMENTS

| CN | 1910553 A | 2/2007 |
| CN | 101446910 A | 6/2009 |

OTHER PUBLICATIONS

Tencent Technology, IPRP, PCT/CN2014/077793, dated May 24, 2016, 5 pgs.

(Continued)

*Primary Examiner* — Aaron N Strange
*Assistant Examiner* — James A Edwards
(74) *Attorney, Agent, or Firm* — Morgan, Lewis & Bockius LLP

(57) ABSTRACT

A method is performed at a server system comprising one or more processors and memory. The server system executes a task being performed on a first mobile client according to instructions from the first mobile client. The server system receives a handover request from the first mobile client, which indicates that the first mobile client has suspended performance of the task and includes information identifying one or more second mobile clients who are candidates to assume performance of the task. The server system sends, to at least a subset of the second mobile clients, a request to assume performance of the task and receives, from a respective second mobile client of the subset of the second mobile clients, an indication that the respective second mobile client intends to assume performance of the task. The server system executes the task according to instructions received from the respective second mobile client.

14 Claims, 18 Drawing Sheets

(51) Int. Cl.
*H04L 29/08* (2006.01)
*A63F 13/70* (2014.01)
*H04W 4/16* (2009.01)
*H04L 29/06* (2006.01)
*H04W 4/80* (2018.01)

(52) U.S. Cl.
CPC ............... *H04L 67/38* (2013.01); *H04W 4/16* (2013.01); *H04W 4/80* (2018.02)

(56) References Cited

U.S. PATENT DOCUMENTS

| | | | |
|---|---|---|---|
| 8,414,387 B1* | 4/2013 | Paradise | G07F 17/3225 463/25 |
| 9,032,022 B1* | 5/2015 | Dunn | H04L 67/42 709/201 |
| 2005/0036509 A1* | 2/2005 | Acharya | H04L 63/0428 370/466 |
| 2006/0040735 A1* | 2/2006 | Baerlocher | G07F 17/32 463/26 |
| 2006/0128466 A1* | 6/2006 | Moshal | G07F 17/32 463/31 |
| 2009/0011827 A1* | 1/2009 | Englman | G07F 17/34 463/27 |
| 2009/0164549 A1* | 6/2009 | Jung | G06Q 30/02 709/201 |
| 2011/0216002 A1* | 9/2011 | Weising | G09G 5/08 345/158 |
| 2012/0115590 A1* | 5/2012 | Rowe | G07F 17/32 463/25 |
| 2013/0165234 A1* | 6/2013 | Hall | A63F 13/00 463/42 |
| 2013/0178281 A1* | 7/2013 | Ayyar | A63F 13/12 463/30 |
| 2014/0128138 A1* | 5/2014 | Wickett | G07F 17/3237 463/13 |

OTHER PUBLICATIONS

Tencent Technology, ISR, PCT/CN2014/077793, dated Aug. 26, 2014, 3 pgs.

Tencent Technology, Written Opinion, PCT/CN2014/077793, dated Aug. 26, 2014, 4 pgs.

* cited by examiner ated May 19, 2014, which claims priority to
TASK EXECUTION METHOD, APPARATUS AND SYSTEM

RELATED APPLICATIONS

This application is a continuation application of PCT Patent Application No. PCT/CN2014/077793, entitled "TASK EXECUTION METHOD, APPARATUS AND SYSTEM" filed on May 19, 2014, which claims priority to Chinese Patent Application No. 201310591483.2, entitled "TASK EXECUTION METHOD, APPARATUS AND SYSTEM" filed on Nov. 21, 2013, both of which are herein incorporated by reference in their entirety.

FIELD OF THE DISCLOSURE

The present application relates to the field of mobile client devices, and in particular, to a task execution method, apparatus and system.

BACKGROUND OF THE DISCLOSURE

With the development of Internet and electronic technologies, mobile client devices such as smart phones, tablet personal computers (PCs), e-book readers and ultrabooks have been widely applied in the daily lives of users. To be sure, such devices have become the first-choice devices for entertainment, education, and work. Often, these devices are used in a collaborative nature, in which users perform tasks and interact with one another through online gaming, crowdsourcing, etc.

Conventional methods of transferring tasks performed on mobile client devices are inadequate or inconvenient for users (for example, transferring control of an online game, or transferring work on a crowdsourcing project). For example, conventional methods of transferring tasks do not allow easy identification of those who are candidates to resume performance of the task. Conventional methods also do not conveniently notify such candidates that their help is desired.

SUMMARY

To address the aforementioned problems, a method is provided for handling task execution. In particular, the method provides a manner in which a task can be transferred from one client device to another client device. The method is performed at a server system comprising one or more processors and memory and includes executing a task being performed on a first mobile client in accordance with instructions received from the first mobile client. The server system receives a handover request from the first mobile client. The handover request indicates that the first mobile client has suspended performance of the task and includes information identifying one or more second mobile clients who are candidates to assume performance of the task. The method further includes sending, to at least a subset of the second mobile clients, a request to assume performance of the task. The server system receives, from a respective second mobile client of the subset of the second mobile clients, an indication that the respective second mobile client intends to assume performance of the task, and executes the task in accordance with instructions received from the respective second mobile client.

In another aspect of the present application, a server system is provided for handling task execution. In particular, the server system is configured to transfer a task from one client device to another client device. The server system includes one or more processors, memory, and one or more programs. The one or more programs are stored in the memory and configured to be executed by the one or more processors. Furthermore, the one or more programs include instructions that when executed by the one or more processors cause the device to execute a task being performed on a first mobile client in accordance with instructions received from the first mobile client. The server system receives a handover request from the first mobile client. The handover request indicates that the first mobile client has suspended performance of the task and includes information identifying one or more second mobile clients who are candidates to assume performance of the task. The server system sends, to at least a subset of the second mobile clients, a request to assume performance of the task. The server system receives, from a respective second mobile client of the subset of the second mobile clients, an indication that the respective second mobile client intends to assume performance of the task, and executes the task in accordance with instructions received from the respective second mobile client.

In another aspect of the present application, a non-transitory computer readable storage medium is provided for instructing a server system to handle task execution. In particular, the non-transitory computer readable storage medium instructs the server system to transfer a task from one client device to another client device. To this end, the non-transitory computer readable storage medium includes instructions that cause the server system to execute a task being performed on a first mobile client in accordance with instructions received from the first mobile client. The server system receives a handover request from the first mobile client. The handover request indicates that the first mobile client has suspended performance of the task and includes information identifying one or more second mobile clients who are candidates to assume performance of the task. The server system sends, to at least a subset of the second mobile clients, a request to assume performance of the task. The server system receives, from a respective second mobile client of the subset of the second mobile clients, an indication that the respective second mobile client intends to assume performance of the task, and executes the task in accordance with instructions received from the respective second mobile client.

In another aspect of the present application, to address the aforementioned problems, some implementations provide a non-transitory computer readable storage medium storing one or more programs. The one or more programs comprise instructions, which when executed by an server system with one or more processors and memory, cause the server system to perform any of the methods provided herein.

In yet another aspect of the present application, to address the aforementioned problems, some implementations provide a server system. The server system includes one or more processors, memory, and one or more programs. The one or more programs are stored in memory and configured to be executed by the one or more processors. The one or more programs include an operating system and instructions that when executed by the one or more processors cause the server system to perform any of the methods provided herein.

BRIEF DESCRIPTION OF THE DRAWINGS

The aforementioned features and advantages of the present application as well as additional features and advantages thereof will be more clearly understood hereinafter as a result of a detailed description when taken in conjunction with the drawings.

Like reference numerals refer to corresponding parts throughout the drawings.

DESCRIPTION OF EMBODIMENTS

The embodiments described herein provide convenient ways to transfer online tasks from one mobile client to another. Such tasks can include online games, crowdsourcing tasks (e.g., document translation, content composition), and tasks within a professional work environment (e.g., team project tasks). In some embodiments, a first user suspends a task she is performing on an application on her mobile client (e.g., a smart phone, tablet). Information about the task is conveyed to a server system (e.g., synchronized in near real-time and/or at sent at predetermined intervals, such as when the task is suspended). When the task is suspended, the server system stores a "snapshot" of the task and sends requests to other users to assume performance of the task. In some embodiments, the request is sent to other users using a text message, or another type of message that does not require the other users to be logged-into the same application as the first user. In some embodiments, the second users are identified in the first user's request (e.g., either directly or through a group identifier) as candidates to assume performance of the task.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
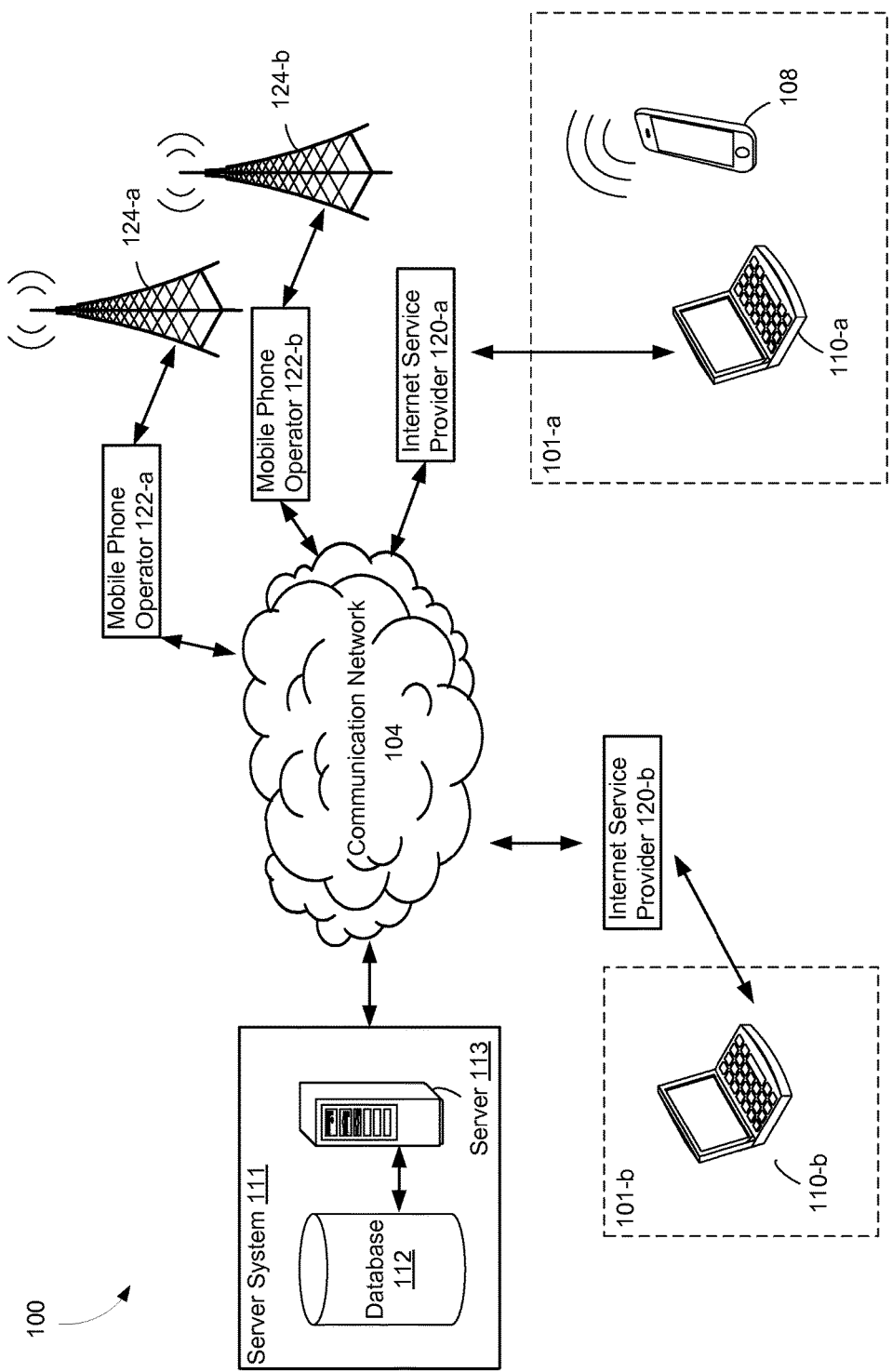
FIG. 1 is a structural block diagram of an implementation environment involved in a task execution method, in accordance with some embodiments.

FIG. 1 is a diagram of a client-server environment 100 in accordance with some implementations. The client-server environment 100 includes a server system 111, one or more mobile phone operators 122, one or more internet service providers 120, and a communications network 104. Each of the server system 111, the mobile phone operator 122 (i.e. wireless carrier), and the Internet service providers 120 are capable of being connected to the communication network 104 in order to exchange information with one another and/or other devices and systems. Within the server system 111, there is a server computer 113 for receiving and processing the data received from mobile client devices 108 and personal/laptop computers 110 (hereinafter "client device(s) 108/110"). For example, in some embodiments, the data received from the mobile client devices 108/110 is used for executing tasks in accordance with instructions from the client devices 108/110.

Within the server system 111, there is also a database 112 for storing information (e.g., user profiles corresponding to respective client devices 108/110). Additionally, the mobile phone operator 122 and the Internet service provider 120 are operable to connect client devices to the communication network 104 as well. For example, a smart phone 108 is operable with the network of the mobile phone operator 122-a, which includes for example, a base station 124-a. Similarly, for example, a first user's laptop computer 110-a (or tablet, desktop, workstation or the like) is connectable to the network provided by a first Internet service provider 120-a, which is ultimately connectable to the communication network 104. A second user's laptop computer 110-b (or tablet, desktop, workstation or the like) is connectable to the network provided by a second internet service provider 120-b, which is ultimately connectable to the communication network 104. The embodiments described herein can be used to transfer a task between the first user's and the second user's respective devices.

The communication network 104 may be any combination of wired and wireless local area network (LAN) and/or wide area network (WAN), such as an intranet, an extranet, including a portion of the Internet. It is sufficient that the communication network 104 provides communication capability between client devices and servers. In some implementations, the communication network 104 uses the HyperText Transport Protocol (HTTP) to transport information using the Transmission Control Protocol/Internet Protocol (TCP/IP). HTTP permits a client device to access various resources available via the communication network 104. However, the various implementations described herein are not limited to the use of any particular protocol.

Moreover, those skilled in the art will appreciate from the present application that any number of such devices and/or systems may be provided in a client-server environment, and particular devices may be altogether absent. In other words, the client-server environment 100 is merely an example provided to discuss more pertinent features of the present application.

Figure 2:
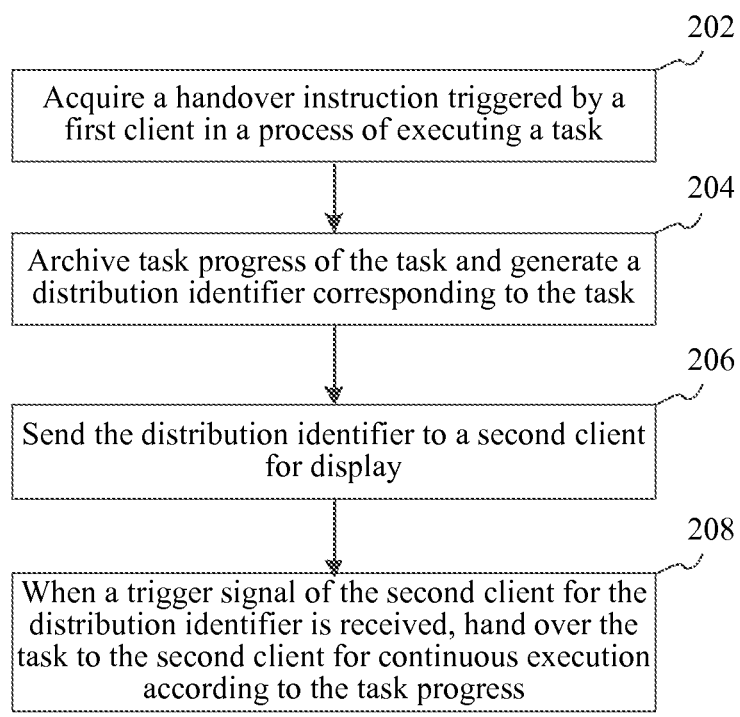
FIG. 2 is a flow chart of a task execution method, in accordance with some embodiments.

Referring to FIG. 2, FIG. 2 is a flow chart of a task execution method according to some embodiments of the present application. This embodiment uses that the task execution method is applied to the side of the server shown in FIG. 1 as an example for description. The method includes the following steps.

Step 202. Acquire a handover instruction triggered by a first client in a process of executing a task.

A server acquires a handover instruction triggered by a first client in a process of executing a task.

Step 204. Archive task progress of the task and generate a distribution identifier corresponding to the task.

The server archives task progress of the task and generates a distribution identifier corresponding to the task.

Step 206. Send the distribution identifier to a second client for display.

The server sends the distribution identifier to a second client for display.

Step 208. When a trigger signal of the second client for the distribution identifier is received, hand over the task to the second client for continuous execution according to the task progress.

When a trigger signal of the second client for the distribution identifier is received, the server hands over the task to the second client for continuous execution according to the task progress.

To sum up, in the task execution method according to this embodiment, a server acquires a handover instruction triggered by a first client in a process of executing a task, archives task progress of the task and generates a distribution identifier corresponding to the task; the server sends the distribution identifier to a second client for display; and when a trigger signal of the second client for the distribution identifier is received, the server hands over the task to the second client for continuous execution according to the task progress, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 3:
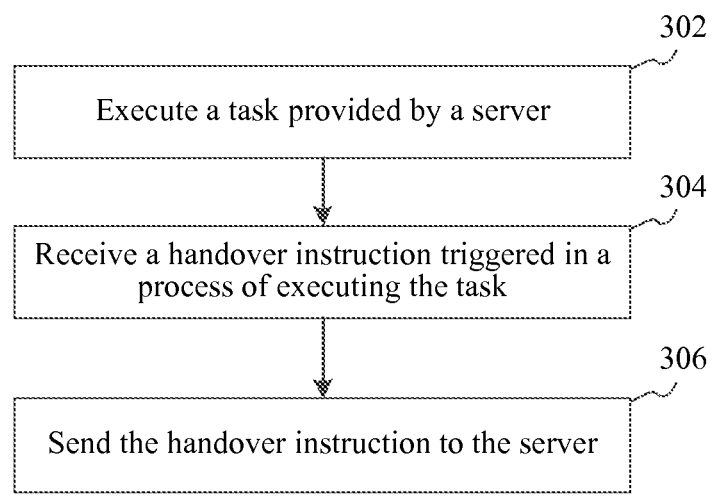
FIG. 3 is a flow chart of a task execution method, in accordance with some embodiments.

Referring to FIG. 3, FIG. 3 is a flow chart of a task execution method according to another embodiment of the present application. This embodiment uses that the task execution method is applied to the side of the first client shown in FIG. 1 as an example for description. The method includes the following steps.

Step 302. Execute a task provided by a server.

A first client executes a task provided by a server.

Step 304. Receive a handover instruction triggered in a process of executing the task.

The first client receives a handover instruction triggered in a process of executing the task.

Step 306. Send the handover instruction to the server.

The first client sends the handover instruction to the server, and the handover instruction is used for triggering the server to archive task progress of the task and generate a distribution identifier corresponding to the task; send the distribution identifier to a second client for display; and when a trigger signal of the second client for the distribution identifier is received, hand over the task to the second client for continuous execution according to the task progress.

To sum up, in the task execution method according to this embodiment, a first client receives a handover instruction triggered in a process of executing a task, and sends the handover instruction to a server, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 4:
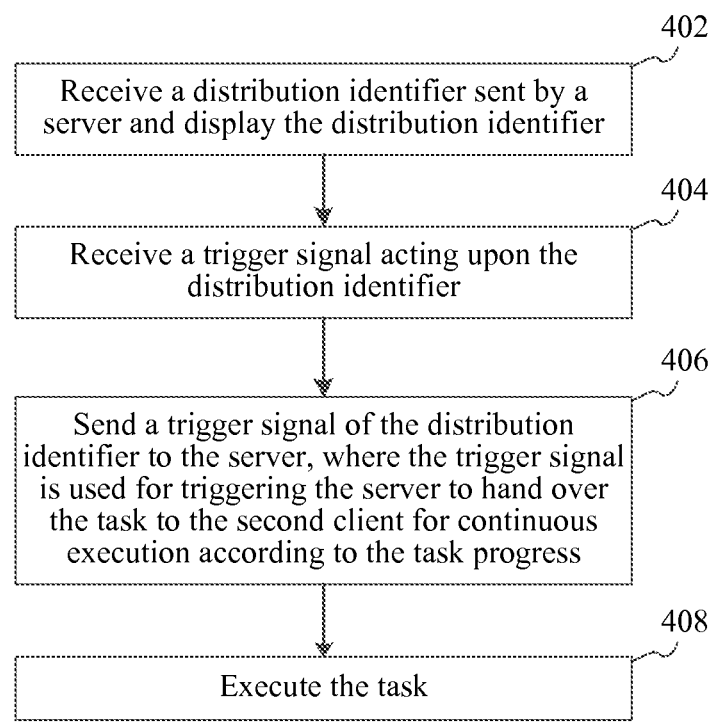
FIG. 4 is a flow chart of another task execution method, in accordance with some embodiments.

Referring to FIG. 4, FIG. 4 is a flow chart of a task execution method according to still another embodiment. This embodiment uses that the task execution method is applied to the side of the second client shown in FIG. 1 as an example for description. The method includes the following steps.

Step 402. Receive a distribution identifier sent by a server and display the distribution identifier.

A second client receives a distribution identifier sent by a server and displays the distribution identifier, where the distribution identifier is an identifier corresponding to a task and generated after the server acquires a handover instruction triggered by a first client in a process of executing the task and archives task progress of the task.

Step 404. Receive a trigger signal acting upon the distribution identifier.

The second client receives a trigger signal acting upon the distribution identifier.

Step 406. Send a trigger signal of the distribution identifier to the server, where the trigger signal is used for triggering the server to hand over the task to the second client for continuous execution according to the task progress.

The second client sends a trigger signal of the distribution identifier to the server, where the trigger signal is used for triggering the server to hand over the task to the second client for continuous execution according to the task progress.

Step 408. Execute the task.

The second client continues to execute the task.

To sum up, in the task execution method according to this embodiment, a second client receives a distribution identifier sent by a server and displays the distribution identifier; receives a trigger signal acting upon the distribution identifier; sends a trigger signal of the distribution identifier to the server; and continues to execute the task, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 5A:
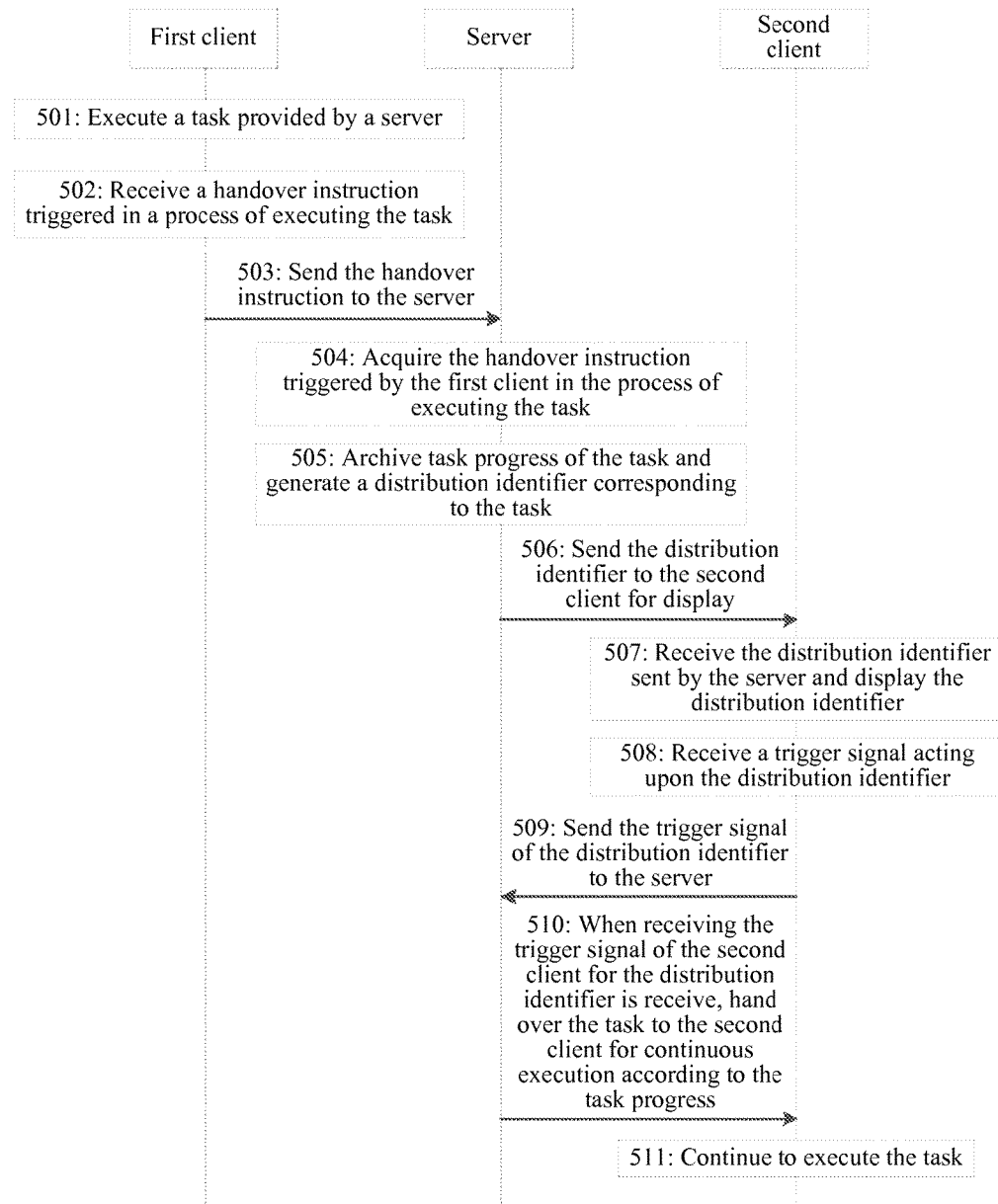
FIG. 5A is a flow chart of a task execution method, in accordance with some embodiments.

Referring to FIG. 5A, FIG. 5A is a flow chart of a task execution method according to yet another embodiment of the present application. This embodiment uses that the task execution method is applied to the implementation environment shown in FIG. 1 as an example for description. The method includes the following steps.

Step 501. A first client executes a task provided by a server.

A task is a data processing work provided by a server to be completed by a user through operations on a client, for example, the task is an online documentation task, an online document translation task, an online equipment maintenance task, an online game task and the like. The first client executes a task provided by the server. In a process of executing the task, the first client receives various operations of the user, and responds to the various operations to execute the task.

Figure 5B:
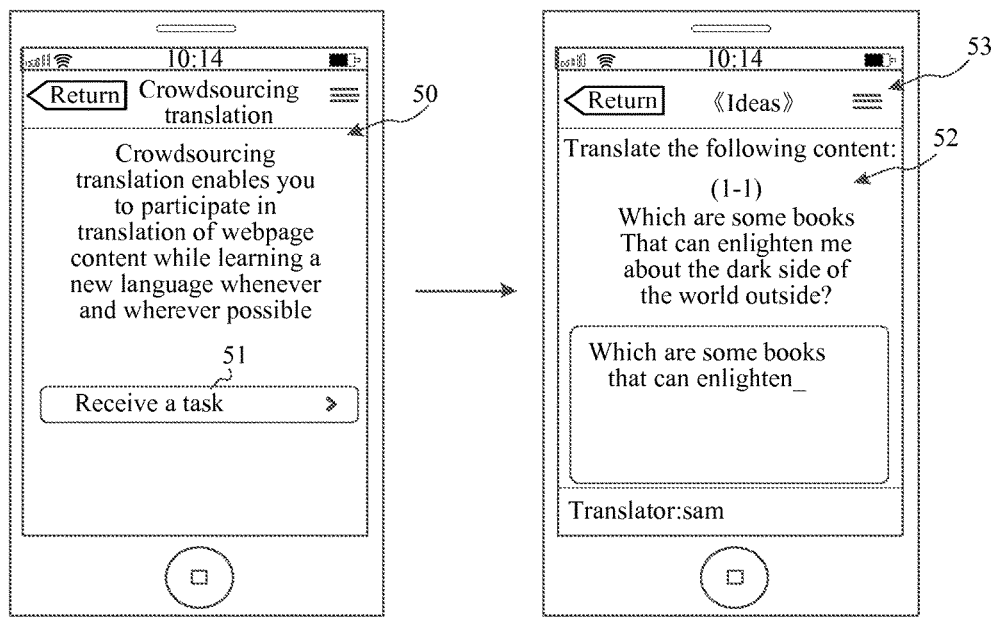
FIGS. 5B-5E are schematic diagrams of an interface when the task execution method shown in FIG. 5A is implemented, in accordance with some embodiments.

By using that the first client is an instant voice client operating on a mobile phone and the task is an online document translation task as an example, a user clicks on a button 51 on the first client 50 to start translating an article 52, as shown in FIG. 5B.

Step 502. The first client receives a handover instruction triggered in a process of executing the task.

In a process of executing the task, if the user has another thing to deal with and cannot continue executing the current task, the user triggers a handover instruction, and the first client receives the handover instruction triggered in the process of executing the task.

Figure 5C:
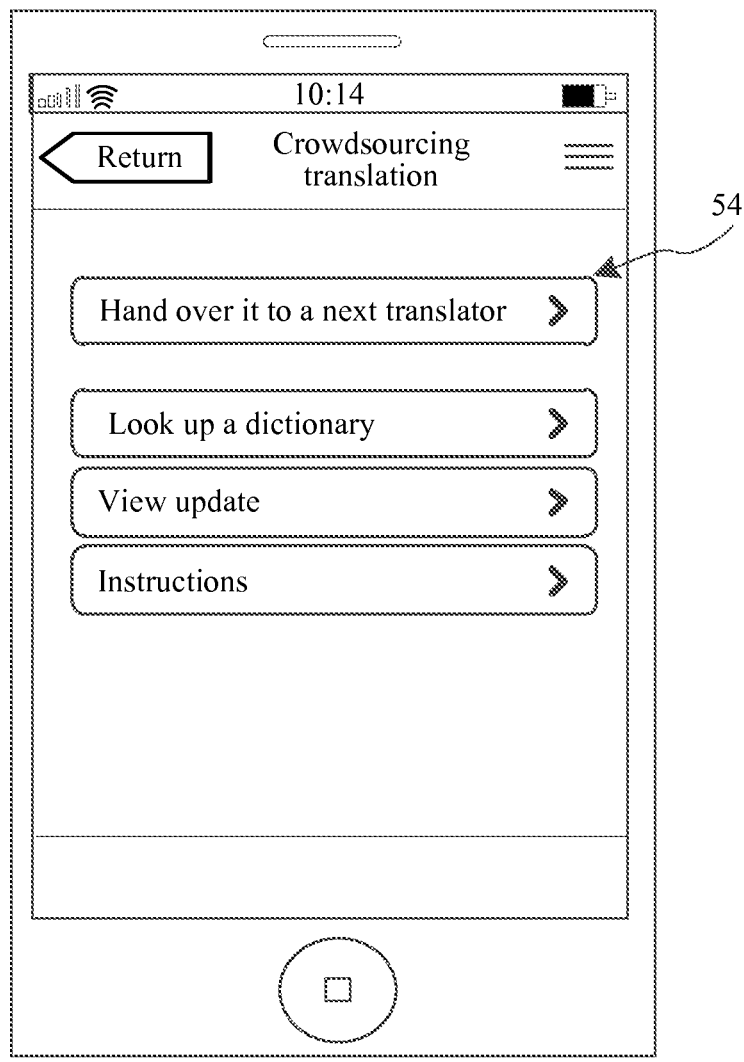

For example, after clicking on a menu button 53 on the first client 50 to switch to another interface, the user triggers a handover instruction by clicking on a button 54, as shown in FIG. 5C.

Step 503. The first client sends the handover instruction to the server.

The first client sends the handover instruction to the server.

Optionally, because the first client is an instant messaging client, the user may specify that the task is handed over to a second client used by a friend of the user, and at this time, the handover instruction carries identity of the second client.

Step 504. The server acquires the handover instruction triggered by the first client in the process of executing the task.

The server receives the handover instruction sent by the first client.

As another implementation manner of this step, the first client does not need to actively send the handover instruction to the server, and in the process that the first client executes a task, the server detects whether the first client triggers a predetermined condition when executing the task; if a detection result of the server is that the first client triggers the predetermined condition when executing the task, the server automatically generates the handover instruction. It should be apparent that the server may divide the task into several stages, and completion of each stage can be regarded as that the predetermined condition is triggered.

For example, in the task, a document to be translated is divided into several chapters, and when the server detects that the first client has translated one chapter therein, the server automatically generates a handover instruction. For another example, if the task is an online game task, the server automatically generates a handover instruction when detecting that the first client dies, fails or passes a certain level in the game.

Step 505. The server archives task progress of the task and generates a distribution identifier corresponding to the task.

The server archives task progress of the task and generate a distribution identifier corresponding to the task. The distribution identifier is a link or a string of characteristic codes having unique identification. The distribution identifier corresponds to the task, and according to whether the distribution identifier carries task information of the task, this step is divided into the following two different implementation manners.

Firstly, the server archives task progress of the task, generates a distribution identifier corresponding to the task, and associates the distribution identifier with task information of the task, where the task information includes a task identifier and the task progress of the task.

Secondly, the server archives the progress of the task, and generates a distribution identifier corresponding to the task and carrying task information, where the task information includes a task identifier and the task progress of the task.

It should be noted that the task information may not only include the task identifier and the task progress of the task, but also optionally include at least one of a grouping identifier, state information of the distribution identifier, handover channel information and statistical parameters.

The grouping identifier is used for uniquely identifying a client group, and grouping means that if it is pre-designated that the first client and another client need to complete the task in collaboration, the first client and the another client may be classified into the same group and stored on the server to serve as part of the task information of the task. The process of pre-designation may be designated by the server, and also may be designated by the first client according to an operation of the user.

The state information of the distribution identifier is a state of the distribution identifier maintained by the server, and the state of the distribution identifier may include: whether it has been triggered by the second client, whether it has been continuously executed by the second client, and whether it has expired. The wording "expired" means that each task is set to have a period of validity after being archived, and the task exceeding the period of validity will be deleted by the server, moved to another memory for storage or performing of other processing, or the like.

The handover channel information indicates through which channel the distribution is sent to the second client, and the channel includes instant messaging, instant voice information, microblog and SNS information.

The statistical parameters refer to some operation or monitoring parameters that the server makes statistics on the task. For example, if the distribution identifier is sent to multiple second clients, the server may make statistics on a click-through rate of the distribution identifier by means of the statistical parameters. For another example, the task is specifically provided for a certain activity, and the server may make statistics on the hotness of the activity by means of the statistical parameters.

Step 506. The server sends the distribution identifier to the second client for display.

If the task information carries handover channel information, the server sends the distribution identifier to the second client through a channel designated by the handover channel information. Based on different manners of determining the second client by the server, this step is divided into the following several different implementation manners.

First, the server queries second clients belonging to the same group as the first client. The server sends the distribution identifier to the second clients belonging to the same group.

The second clients belonging to the same group are pre-designated by the first client or the server. In other words, before the first client executes the task, the first client or the server may group at least one second client and the first client into the same group, and assign a corresponding grouping identifier. In this step, the server may query second clients belonging to the same group with the first client according to the grouping identifier.

Second, the server queries second clients having a friend relationship with the first client. The server sends the distribution identifier to the second clients having a friend relationship.

The server also may query second clients having a friend relationship with the first client to send the distribution identifier. If the number of the second clients obtained through query is multiple, the distribution identifier may be sent to all the second clients obtained through query, and the distribution identifier may also be sent to a part of the second clients obtained through query that are selected according to a predetermined condition. The predetermined condition may be that: the hotness of contact with the first client exceeds a predetermined threshold, the duration in which the friend relationship has been established with the first client exceeds a predetermined duration, communication with the first client exists in a recent predetermined time or the like.

Thirdly, if the handover instruction indicates that there is a second client, the server sends the distribution identifier to the indicated second client.

If the first client carries the identity of the second client in the handover instruction, that is, the first client indicates to whom the task is to be handed over, the server sends the distribution identifier to the indicated second client.

Fourthly, the server sends the distribution identifier to a randomly selected second client.

The server may also send the distribution identifier to at least one randomly selected second client.

Step 507. The second client receives the distribution identifier sent by the server and displays the distribution identifier.

The second client may receive the distribution identifier sent by the server and display the distribution identifier to the user. Because the distribution identifier is a link or characteristic code, the second client may directly display the distribution identifier to the user. When the distribution identifier carries task information, the second client may also parse the task information in the link or characteristic code, so as to display the distribution identifier by using at least one of a picture, a text and a sound.

Figure 5D:
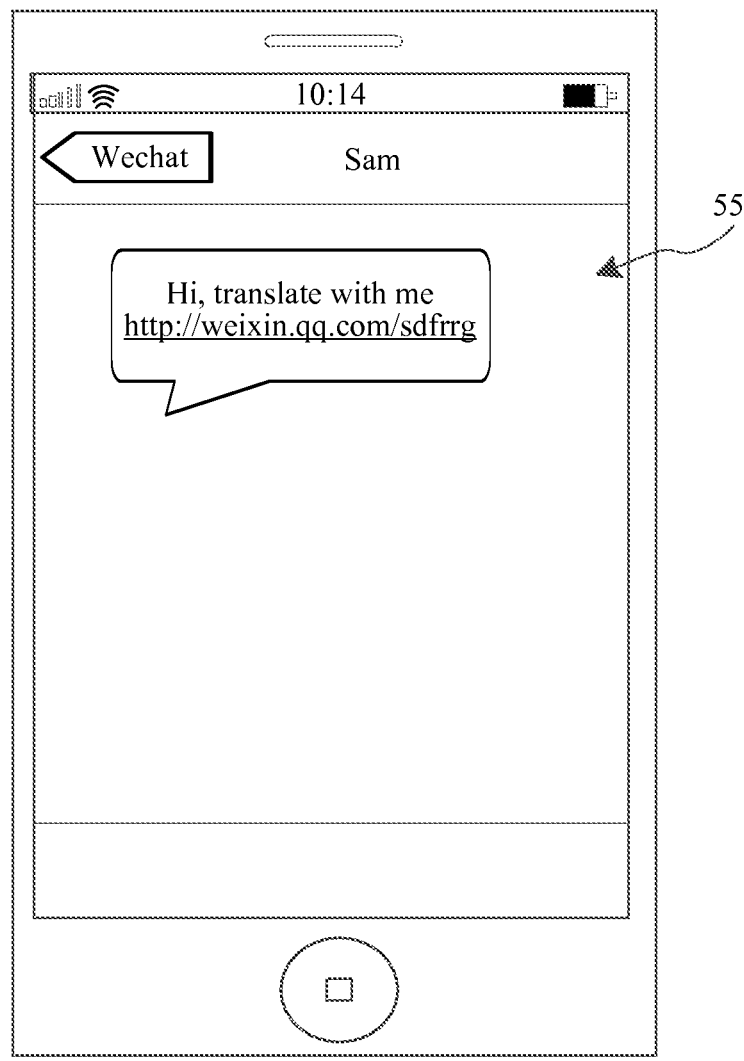

For example, if the distribution identifier is a link 55, the second client directly displays the distribution identifier to the user, as shown in FIG. 5D.

Figure 5E:
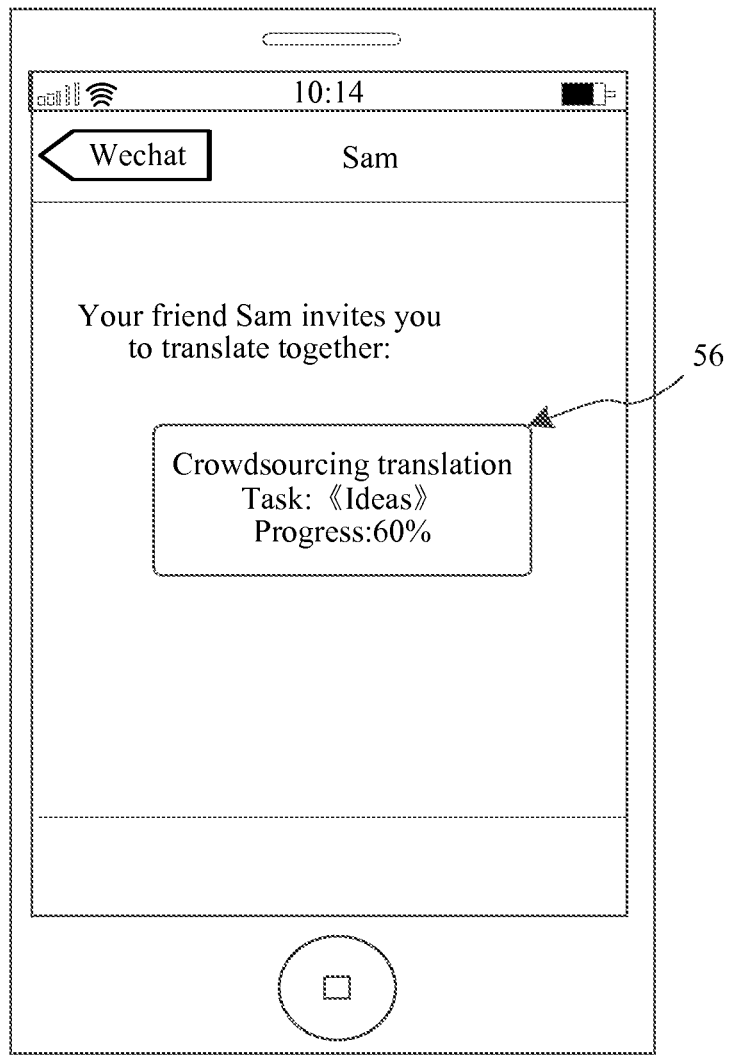

For another example, the second client parses the task information in the link or characteristic code, so as to display the distribution identifier with a picture 56, as shown in FIG. 5E.

Step 508. The second client receives a trigger signal acting upon the distribution identifier.

The second client receives a trigger signal acting upon the distribution identifier, where the trigger signal may be a click signal.

Step 509. The second client sends a trigger signal of the distribution identifier to the server.

The trigger signal may carry the distribution identifier or the task information in the distribution identifier.

Step 510. When the trigger signal of the second client for the distribution identifier is received, the server hands over the task to the second client for continuous execution according to the task progress.

This step may include the following sub-steps.

Firstly, the server receives the trigger signal of the second client for the distribution identifier.

If the distribution identifier is a link, the server may determine, by monitoring the link, which distribution identifier is triggered; if the distribution identifier is a characteristic code, the server may determine, through the distribution identifier or the task information in the distribution identifier carried in the trigger signal, which distribution identifier is triggered.

Secondly, if the distribution identifier carries no task information, the server queries corresponding task information according to the distribution identifier; if the distribution identifier carries task information, the server parses the task information carried in the distribution identifier.

The task information includes a task identifier and task progress, and optionally includes at least one of a grouping identifier, state information of the distribution identifier, handover channel information and statistical parameters.

Thirdly, the server reconstructs the task corresponding to the task identifier according to the task progress and then hands over the reconstructed task to the second client for continuous execution.

The server determines the corresponding task according to the task identifier obtained through query, reconstructs the task according to the task progress of the task recently archived and then hands over the reconstructed task to the second client for continuous execution.

Step 511. The second client continues to execute the task.

The second client executes the task provided by the server. In the process of executing the task, the second client receives various operations of a user, and responds to the various operations to continue to execute the task.

It should be additionally noted that it is not limited that one task is completed by two clients in collaboration, and the task may also be completed by three or more clients through multiple relays, and this embodiment only uses that two clients, a first client and a second client, complete the task in collaboration as an example for description, and there is no specific limit on the number of clients completing one task in collaboration.

At the same time, upon completion of the task, the server may also generate relevant task complete information according to all clients executing the task, for example, an honor list of maximum translation number of two persons in collaboration, an honor list of maximum translation speed of three persons in collaboration, and the like.

To sum up, in the task execution method according to this embodiment, a server acquires a handover instruction triggered by a first client in a process of executing a task, archives task progress of the task and generating a distribution identifier corresponding to the task; the server sends the distribution identifier to a second client for display; and when a trigger signal of the second client for the distribution identifier is received, the server hands over the task to the second client for continuous execution according to the task progress, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Particularly, this embodiment enables the first client to suspend task execution at any time through a handover instruction easily triggered; enables the second client to relay the task execution at any time by triggering a distribution identifier, without being affected by fragmentization of time when the first client and the second client operate in a mobile client device, so that the mobile client device executes the task with a more suitable execution method, which is very different from a desktop platform.

It also should be further noted that the above embodiments only use translation tasks as an example for description, but tasks that the task execution method according to this embodiment is applied to are not limited thereto, which also may be other tasks that can be completed through relay of a number of persons, such as game entertainment tasks or procurement tasks.

In a specific implementation scenario, the first client is a WeChat client used by Mike, and the second client is a QQ client used by Lucy; Mike uses the WeChat client to execute an aircraft game task provided by the server on his way to work on the bus, and after arriving at the company, Mike hands over the aircraft game task to the QQ client used by Lucy in the form of a link displayed on microblog; Lucy finds the microblog from Mike at lunch time, clicks on the link in the microblog to start relaying the aircraft game task, and finally gets a high score of 190000001; then the server announces the results in social spaces of Mike and Lucy.

In another specific implementation scene, the first client is a WeChat client used by a purchaser Tom, and the second client is a WeChat client used by Tom's colleague Jack; Tom has received a procurement task from the company headquarter sent by the server, and needs to purchase 100 Material A and 280 Material B. When purchasing in a material market of Beijing, due to shortages, Tom only purchases 60 Material A and 100 Material B, and Tom hands over the procurement task to Jack's WeChat client in the form of a link displayed on a WeChat message. After clicking on the link in the WeChat message, Jack purchases the remaining materials in a material market of Shanghai, so as to complete the task through relay.

Figure 6:
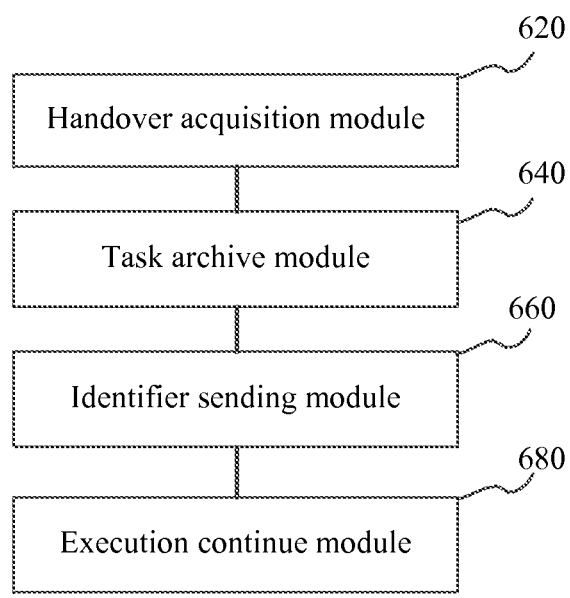
FIG. 6 is a structural block diagram of a task execution apparatus, in accordance with some embodiments.

Referring to FIG. 6, FIG. 6 is a structural block diagram of a task execution apparatus according to one embodiment of the present application. The task execution apparatus may be implemented as all or part of a server through software, hardware or a combination of the two. The apparatus includes: a handover acquisition module 620, a task archive module 640, an identifier sending module 660 and an execution continue module 680.

The handover acquisition module 620 is used for acquiring a handover instruction triggered by a first client in a process of executing a task.

The task archive module 640 is used for archiving task progress of the task and generating a distribution identifier corresponding to the task.

The identifier sending module 660 is used for sending the distribution identifier to a second client for display.

The execution continue module 680 is used for, when a trigger signal of the second client for the distribution identifier is received, handing over the task to the second client for continuous execution according to the task progress.

To sum up, the task execution apparatus according to this embodiment acquires a handover instruction triggered by a first client in a process of executing a task through a server, archives task progress of the task and generates a distribution identifier corresponding to the task; the server sends the distribution identifier to a second client for display; and when a trigger signal of the second client for the distribution identifier is received, hands over the task to the second client for continuous execution according to the task progress, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 7:
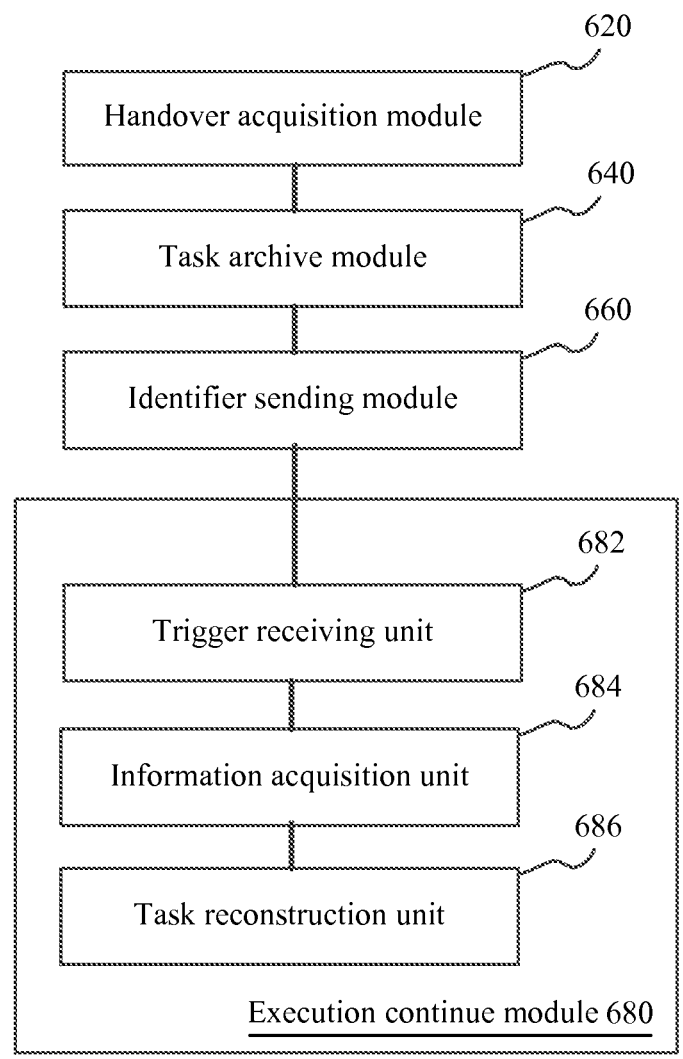
FIG. 7 is a structural block diagram of another task execution apparatus, in accordance with some embodiments.

Referring to FIG. 7, FIG. 7 is a structural block diagram of a task execution apparatus according to another embodiment of the present application. The task execution apparatus may be implemented as all or part of a server through software, hardware or a combination of the two. The apparatus includes: a handover acquisition module 620, a task archive module 640, an identifier sending module 660 and an execution continue module 680.

The handover acquisition module 620 is used for acquiring a handover instruction triggered by a first client in a process of executing a task.

Specifically, the handover acquisition module 620 is used for detecting whether the first client triggers a predetermined condition when executing the task; and if a detection result is that the predetermined condition is triggered, generating the handover instruction. Alternatively, the handover acquisition module 620 is used for receiving the handover instruction sent by the first client.

The task archive module 640 is used for archiving task progress of the task and generating a distribution identifier corresponding to the task.

Specifically, the task archive module 640 is used for archiving task progress of the task, generating a distribution identifier corresponding to the task, and associating the distribution identifier with task information of the task, where the task information includes a task identifier and the task progress of the task. Alternatively, the task archive module 640 is used for archiving task progress of the task, and generating a distribution identifier corresponding to the task and carrying task information, where the task information includes a task identifier and the task progress of the task.

The identifier sending module 660 is used for sending the distribution identifier to a second client for display.

Specifically, the identifier sending module 660 is used for querying second clients belonging to the same group with the first client; and sending the distribution identifier to the second clients belonging to the same group, where the second clients belonging to the same group are pre-designated by the first client or the server. Alternatively, the identifier sending module 660 is used for querying second clients having a friend relationship with the first client; and sending the distribution identifier to the second clients having a friend relationship; alternatively, the identifier sending module 660 is used for, if the handover instruction indicates that there is a second client, sending the distribution identifier to the indicated second client; alternatively, the identifier sending module 660 is used for sending the distribution identifier to a randomly selected second client.

The execution continue module 680 is used for, when a trigger signal of the second client for the distribution identifier is received, handing over the task to the second client for continuous execution according to the task progress.

Specifically, the execution continue module 680 includes: a trigger receiving unit 682, an information acquisition unit 684 and a task reconstruction unit 686.

The trigger receiving unit 682 is used for receiving a trigger signal of the second client for the distribution identifier.

The information acquisition unit 684 is used for, if the distribution identifier carries no task information, querying corresponding task information according to the distribution identifier; and if the distribution identifier carries task information, parsing the task information carried in the distribution identifier, where the task information includes the task identifier and the task progress.

The task reconstruction unit 686 is used for reconstructing the task corresponding to the task identifier according to the task progress and then handing over the reconstructed task to the second client for continuous execution.

To sum up, the task execution apparatus according to this embodiment acquires a handover instruction triggered by a first client in a process of executing a task through a server, archives task progress of the task and generates a distribution identifier corresponding to the task; the server sends the distribution identifier to a second client for display; and when a trigger signal of the second client for the distribution identifier is received, hands over the task to the second client for continuous execution according to the task progress, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Particularly, this embodiment enables the first client to suspend task execution at any time through a handover instruction easily triggered; enables the second client to relay the task execution at any time by triggering a distribution identifier, without being affected by fragmentization of time when the first client and the second client operate in a mobile client device, so that the mobile client device executes the task with a more suitable execution method, which is very different from a desktop platform.

Figure 8:
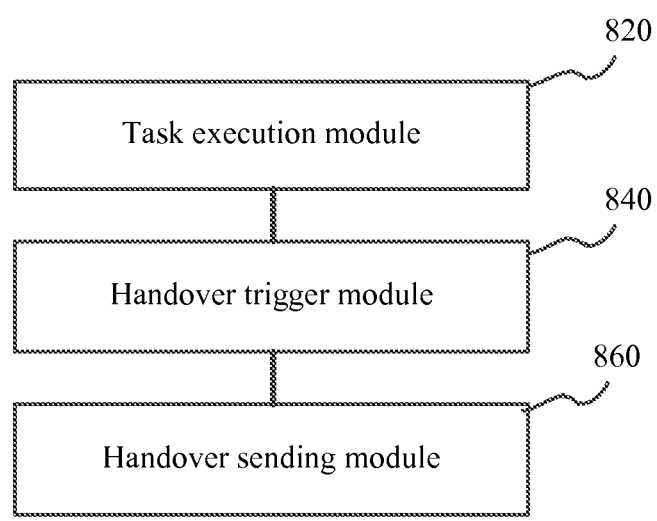
FIG. 8 is a structural block diagram of yet another task execution apparatus, in accordance with some embodiments.

Referring to FIG. 8, FIG. 8 is a structural block diagram of a task execution apparatus according to still another embodiment of the present application. The task execution apparatus may be implemented as all or part of a first client through software, hardware or a combination of the two. The apparatus includes: a task execution module 820, a handover trigger module 840 and a handover sending module 860.

The task execution module 820 is used for executing a task provided by a server.

The handover trigger module 840 is used for receiving a handover instruction triggered in a process of executing the task.

The handover sending module 860 is used for sending the handover instruction to the server, where the handover instruction is used for triggering the server to archive task progress of the task and generate a distribution identifier corresponding to the task; send the distribution identifier to a second client for display; and when a trigger signal of the second client for the distribution identifier is received, hand over the task to the second client for continuous execution according to the task progress.

To sum up, the task execution apparatus according to this embodiment receives a handover instruction triggered in a process of executing a task through a first client, and sends the handover instruction to a server, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 9:
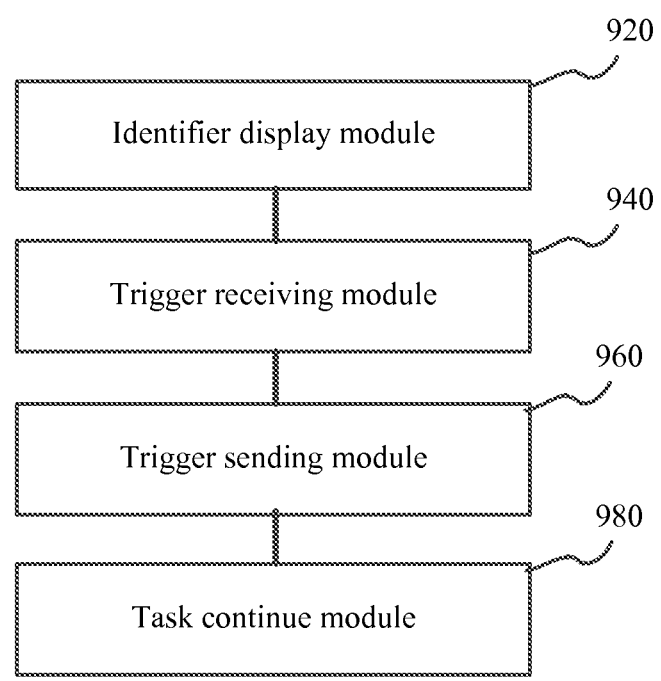
FIG. 9 is a structural block diagram of yet another task execution apparatus, in accordance with some embodiments.

Referring to FIG. 9, FIG. 9 is a structural block diagram of a task execution apparatus according to yet another embodiment of the present application. The task execution apparatus may be implemented as all or part of a second client through software, hardware or a combination of the two. The apparatus includes: an identifier display module 920, a trigger receiving module 940, a trigger sending module 960 and a task continue module 980.

The identifier display module 920 is used for receiving a distribution identifier sent by a server and displaying it, where the distribution identifier is an identifier corresponding to a task and generated after the server acquires a handover instruction triggered by a first client in a process of executing the task and archives task progress of the task.

The trigger receiving module 940 is used for receiving a trigger signal acting upon the distribution identifier.

The trigger sending module 960 is used for sending a trigger signal of the distribution identifier to the server, where the trigger signal is used for triggering the server to hand over the task to the second client for continuous execution according to the task progress.

The task continue module 980 is used for executing the task.

To sum up, the task execution apparatus according to this embodiment receives a distribution identifier sent by a server and displays it through a second client; receives a trigger signal acting upon the distribution identifier; sends a trigger signal of the distribution identifier to the server; and continues to execute the task, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

It should be noted that the task execution apparatus according to the above embodiments only uses division of the functional modules as an example for description when performing page jump, and in actual applications, the functions may be assigned to be completed by different functional modules according to requirements, that is, an internal structure of a device is divided into different functional modules, so as to complete all or part of the functions described above. In addition, the task execution apparatus according to the above embodiments belongs to the same concept with method embodiments of the task execution method, and please refer to the method embodiments for specific implementation process thereof, which is not repeated herein.

Figure 10:
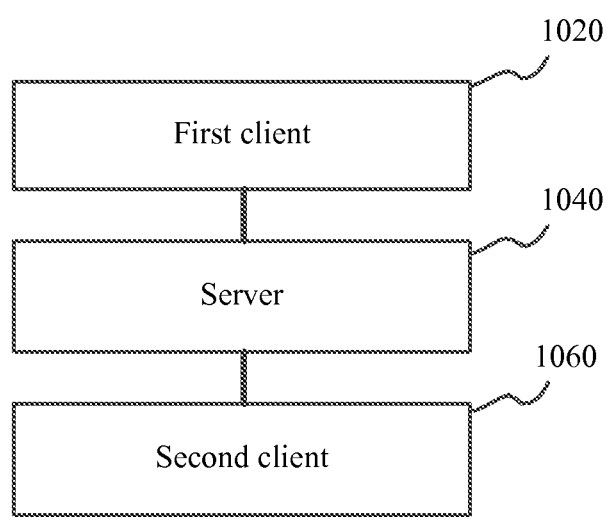
FIG. 10 is a structural block diagram of a task execution system, in accordance with some embodiments.

Referring to FIG. 10, FIG. 10 is a structural block diagram of a task execution system according to some embodiments of the present application. The task execution system includes: a server 1020, a first client 1040 and a second client 1060.

The server 1020 and the first client 1040 are connected to each other by using a wired network or a wireless network; the server 1020 and the second client 1060 are connected to each other by using a wired network or a wireless network.

The server 1020 includes the task execution apparatus according to the embodiment shown in FIG. 6 or FIG. 7.

The first client 1040 includes the task execution apparatus according to the embodiment shown in FIG. 8.

The second client 1060 includes the task execution apparatus according to the embodiment shown in FIG. 9.

To sum up, the task execution system according to this embodiment acquires a handover instruction triggered by a first client in a process of executing a task through a server, archives task progress of the task and generates a distribution identifier corresponding to the task; the server sends the distribution identifier to a second client for display; and when a trigger signal of the second client for the distribution identifier is received, hands over the task to the second client for continuous execution according to the task progress, which solves the problem in the prior art that that tasks cannot be successfully executed caused by fragmentization of time of using a mobile client device, and achieves the effects that the first client can suspend task execution through a handover instruction at any time, the second client can immediately continue the task execution by triggering a distribution identifier, and the first client and the second client use fragment time to complete a task in collaboration.

Figure 11:
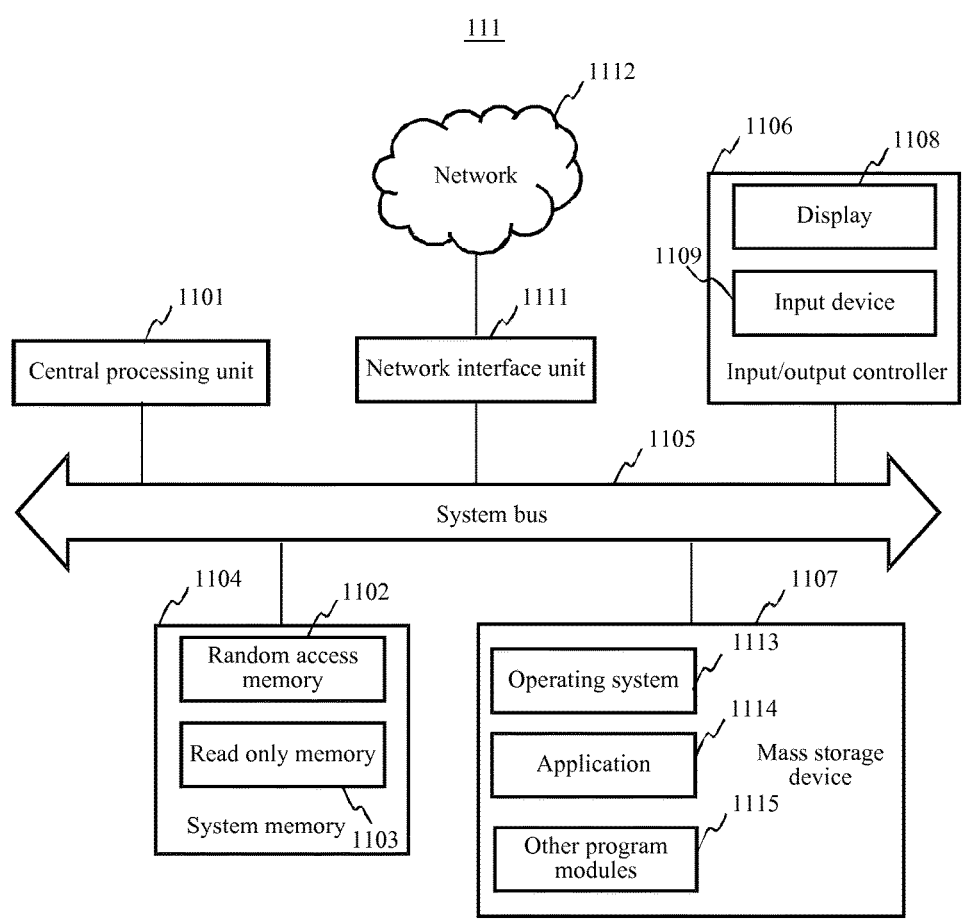
FIG. 11 is a structural block diagram of a server, in accordance with some embodiments.

FIG. 11 is a diagram of an example implementation of a server system 111, discussed above with reference to FIG. 1, in accordance with some implementations. While certain specific features are illustrated, those skilled in the art will appreciate from the present application that various other features have not been illustrated for the sake of brevity and so as not to obscure more pertinent aspects of the implementations disclosed herein. To that end, the server system 111 includes one or more processing units (CPU's) 1101, one or more network or other communications interfaces (e.g., units) 1111 for connecting to a network 1112 (e.g., communication network 104, FIG. 1), and one or more system buses (e.g., communication buses) 1105 for interconnecting these and various other components. The system bus 1105 may include circuitry (sometimes called a chipset) that interconnects and controls communications between system components. The server system 111 includes several types of memory, including system memory 1104, such as random access memory 1108 (e.g., DRAM, SRAM, DDR RAM or other random access solid state memory devices) and/or read only memory (ROM) 1103. The server system 111 also includes a mass storage device 1107. The mass storage device 1107 includes non-volatile memory, such as one or more magnetic disk storage devices, optical disk storage devices, flash memory devices, or other non-volatile solid state storage devices. The mass storage device 1107 may optionally include one or more storage devices remotely located from the CPU(s) 1101. The memory, including the system memory 1104 and the mass storage device 1107, comprises one or more non-transitory computer readable storage media.

In some implementations, the mass storage device 1107 or the non-transitory computer readable storage medium of the mass storage device 1107 stores the following programs, modules and data structures, or a subset thereof including an operating system 1113, one or more applications 1114 (e.g., a task handling module, such as a gaming module for executing a task being performed on a mobile client in accordance with instructions received from the mobile client) and other program modules 1115 (e.g., such as an network communication module).

The operating system 1113 includes procedures for handling various basic system services and for performing hardware dependent tasks.

The network communication module facilitates communication with other devices (e.g., other server systems 111 as well as client devices 108/110) via the one or more communication network interfaces (wired or wireless) and one or more communication networks, such as the internet, other wide area networks, local area networks, metropolitan area networks, and so on.

The server system also optionally includes an input/output (I/O) controller 1106 for handling I/O processes using, for example, an input device 1109 (e.g., a keyboard, mouse), and a display 1108.

Figure 12:
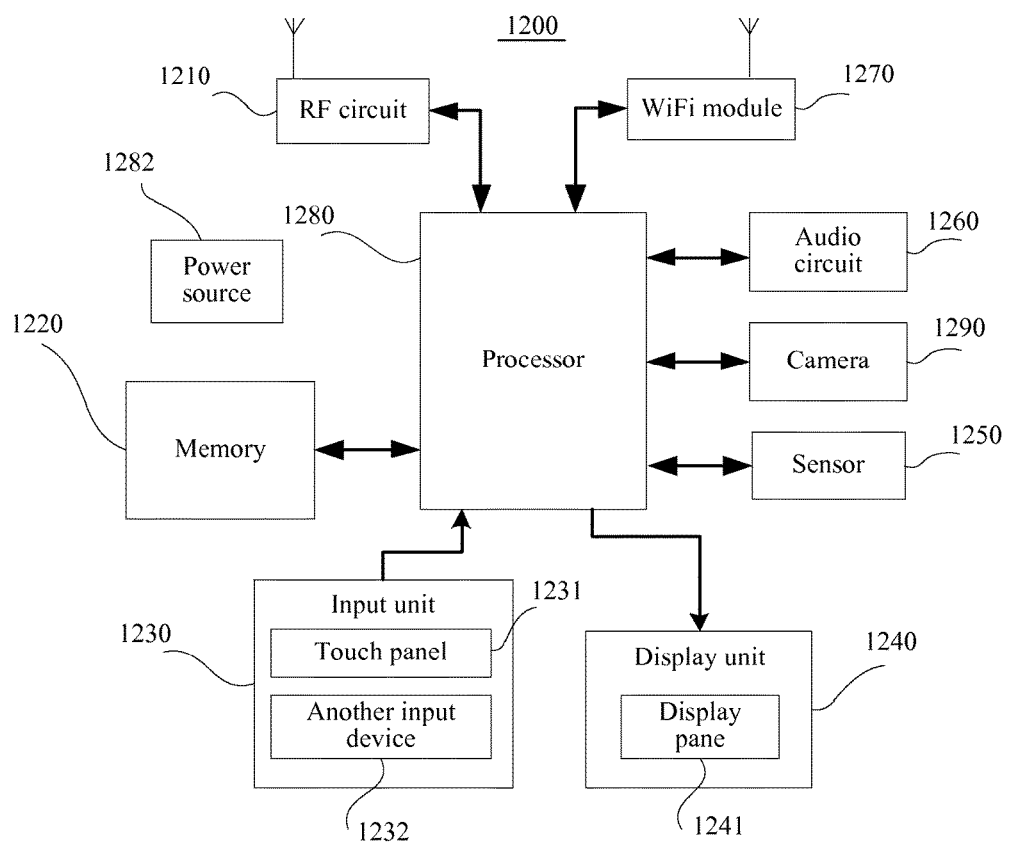
FIG. 12 is a structural block diagram of a client device, in accordance with some embodiments.

Referring to FIG. 12, FIG. 12 is a structural block diagram of a client device 1200 (e.g., client device 108/110) according to some embodiments of the present application. The client device is used for implementing the task execution method according to the above embodiments, and the client device in this embodiment of the present application may include one or more of the following components: a processor for executing computer program instructions to perform various processes and methods, a RAM and a ROM for storing information and program instructions, a memory for storing data and information, an I/O device, an interface, an antenna and the like. Specifically:

The client device 1200 may include a radio frequency (RF) circuit 1210, a memory 1220, an input unit 1230, a display unit 1240, a sensor 1250, an audio circuit 1260, a wireless fidelity (WiFi) module 1270, a processor 1280, a power source 1282, a camera 1290 and other components. Persons skilled in the art may understand that the client device structure shown in FIG. 12 does not limit the client device, which may include components more or less than those illustrated, or combine some components, or have different component arrangements.

Each component of the client device 1200 is specifically introduced below with reference to FIG. 12.

The RF circuit 1210 may be used for receiving and sending signals during information receiving and sending or a call, particularly, after receiving downlink information of a base station, handing over the downlink information to the processor 1280 for processing; and in addition, sending data designed for uplink to the base station. Usually, the RF circuit includes, but is not limited to, an antenna, at least one amplifier, a transceiver, a coupler, a Low Noise Amplifier (LNA), a duplexer and the like. Besides, the RF circuit 1210 may also communicate with other devices by using wireless communication and a network. The wireless communication may use any communication standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mails, Short Messaging Service (SMS) and the like.

The memory 1220 may be used for storing software programs and modules. The processor 1280 executes various functional applications and data processing of the client device 1200 by running the software programs and modules stored in the memory 1220. The memory 1220 may mainly include a program storage region and a data storage region, where the program storage region may store an operating system, an application required by at least one function (such as a voice playback function, or an image playback function); the data storage region may store data (such as audio data or a phone book) created according to use of the client device 1200. In addition, the memory 1220 may include a high-speed random access memory, and also may include a nonvolatile memory, for example, at least one disk storage device, a flash memory device, or other volatile solid-state storage devices.

The input unit 1230 may be used for receiving input numerical information or character information, and generating key signal input relevant to user setting and function control of the client device 1200. Specifically, the input unit 1230 may include a touch panel 1231 and another input device 1232. The touch panel 1231, also called a touch screen, may collect a touch operation of the user on the touch panel or nearby (for example, an operation of the user on the touch panel 1231 or near the touch panel 1231 with a finger, a stylus, and any other suitable object or accessory), and drive a corresponding connection device according to a preset program. Optionally, the touch panel 1231 may include a touch detection device and a touch controller. The touch detection device detects a position touched by the user, detects a signal brought about by the touch operation, and transmits the signal to the touch controller; the touch controller receives touch information from the touch detection device, converts the touch information into a contact coordinate, and then sends the contact coordinate to the processor 1280, and further may receive a command sent by the processor 1280 and execute the command. In addition, the touch panel 1231 may be implemented into multiple types such as resistive, capacitive, infrared, and surface acoustic wave types. In addition to the touch panel 1231, the input unit 1230 may also include another input device 1232. Specifically, the another input device 1232 may include, but is not limited to, one or more of a physical keyboard, a function key (such as a volume control key or a switch key), a trackball, a mouse, and a joystick.

The display unit 1240 may be used for displaying information input by the user or information provided for the user and various menus of the client device 1200. The display unit 1240 may include a display panel 1241, and optionally, the display panel 1241 may be configured in forms such as a Liquid Crystal Display (LCD) or an Organic Light-Emitting Diode (OLED). Further, the touch panel 1231 may cover the display panel 1241, and after detecting the touch operation thereon or nearby, the touch panel 1231 transmits the touch operation to the processor 1280 to determine the type of a touch event, and then the processor 1280 provides corresponding visual output on the display panel 1241 according to the type of the touch event. Although in FIG. 12, the touch panel 1231 and the display panel 1241 implement input and input functions as two separate members, in some embodiments, the touch panel 1231 and the display panel 1241 may be integrated to implement input and output functions of the client device 1200.

The client device 1200 also may include at least one sensor 1250, for example, a gyroscope sensor, a magnetic induction sensor, an optical sensor, a motion sensor, and other sensors. Specifically, the optical sensor may include an ambient light sensor and a proximity sensor, where the ambient light sensor may adjust brightness of the display panel 1241 according to brightness of ambient light, and the proximity sensor may close the display panel 1241 and/or backlight when the client device 1200 moves to the ear. As one kind of the motion sensor, a gravity accelerometer may detect the size of acceleration in various directions (generally triaxial), may detect the magnitude and direction of gravity in the stationary state, and may be used for identifying applications of a client device posture (such as horizontal and vertical screen switching, related games, or magnetometer posture calibration), may vibrate to identify relevant functions (for example, a pedometer, or tapping) and the like; other sensors such as a barometer, a hygrometer, a thermometer, and an infrared sensor that may be configured on the client device 1200 are not repeated herein.

An audio circuit 1260, a loudspeaker 1261, and a microphone 1262 may provide an audio interface between the user and the client device 1200. The audio circuit 1260 may convert received audio data into an electric signal, and then transmit the electric signal to the loudspeaker 1261; and the loudspeaker 1261 converts the electric signal into a sound signal for output. On the other hand, the microphone 1262 converts the collected sound signal into an electric signal, and the audio circuit 1260 receives the electric signal and then converts the electric signal into audio data; after being output to the processor 1280 for processing, the audio data is sent to, for example, another client device by using the RF circuit 1210, or the audio data is output to the memory 1220 for further processing.

WiFi belongs to the short-range wireless transmission technology, and the client device 1200 may help the user to send and receive an e-mail, browse web pages and access streaming media through the WiFi module 1270, which provides wireless broadband Internet access for the users. Although FIG. 12 shows the WiFi module 1270, but it may be understood that the WiFi module 1270 is not a necessary component of the client device 1200, and may be completely saved without changing the essential scope of the present application as required.

The processor 1280 is a control center of the client device 1200, connects various parts of the whole client device by using various interfaces and lines, and executes various functions of the client device 1200 and processes data by running or executing software programs and/or modules stored in the memory 1220, and invoking data stored in the memory 1220, thereby monitoring the client device as a whole. Optionally, the processor 1280 may include one or more processing units; optionally, the processor 1280 may integrate an application processor and a modem processor, where the application processor mainly processes the operating system, user interfaces and applications, and the modem processor mainly processes wireless communication. It may be understood that the modem processor may not be integrated into the processor 1280.

The client device 1200 may also include a power source 1282 (for example, a battery) supplying power for various parts, and preferably, the power source may be logically connected to the processor 1280 through a power management system, so as to achieve functions of charging management, discharging management, and power consumption management through the power management system.

The camera 1290 usually includes a camera lens, an image sensor, an interface, a digital signal processor, a CPU, a display screen and the like. The camera lens is fixed above the image sensor, and may be adjusted manually to change the focus; the image sensor is equivalent to the "film" of the traditional camera, and is the heart of the camera to capture images; the interface is used for connecting the camera to the motherboard of the client device by means of wire arrangement, a board to board connector, or spring-type connection, so as to send the captured images to the memory 1220; the digital signal processor processes the captured images through mathematical operation, converts a captured analog image to a digital image and sends the digital image to the memory 1220 through the interface.

Although not shown, the client device 1200 may also include a Bluetooth module and the like, which is not repeated herein.

In addition to one or more processors 1280, the client device 1200 may include a memory 1220, where one or more programs are stored in the memory 1220, the one or more programs are configured to be executed by the one or more processors 1280, and the one or more programs are used for executing the task execution method shown in FIG. 3 or FIG. 5 when the first client is run; and the one or more programs are used for executing the task execution method shown in FIG. 4 or FIG. 5A when the second client is run.

Figure 13A:
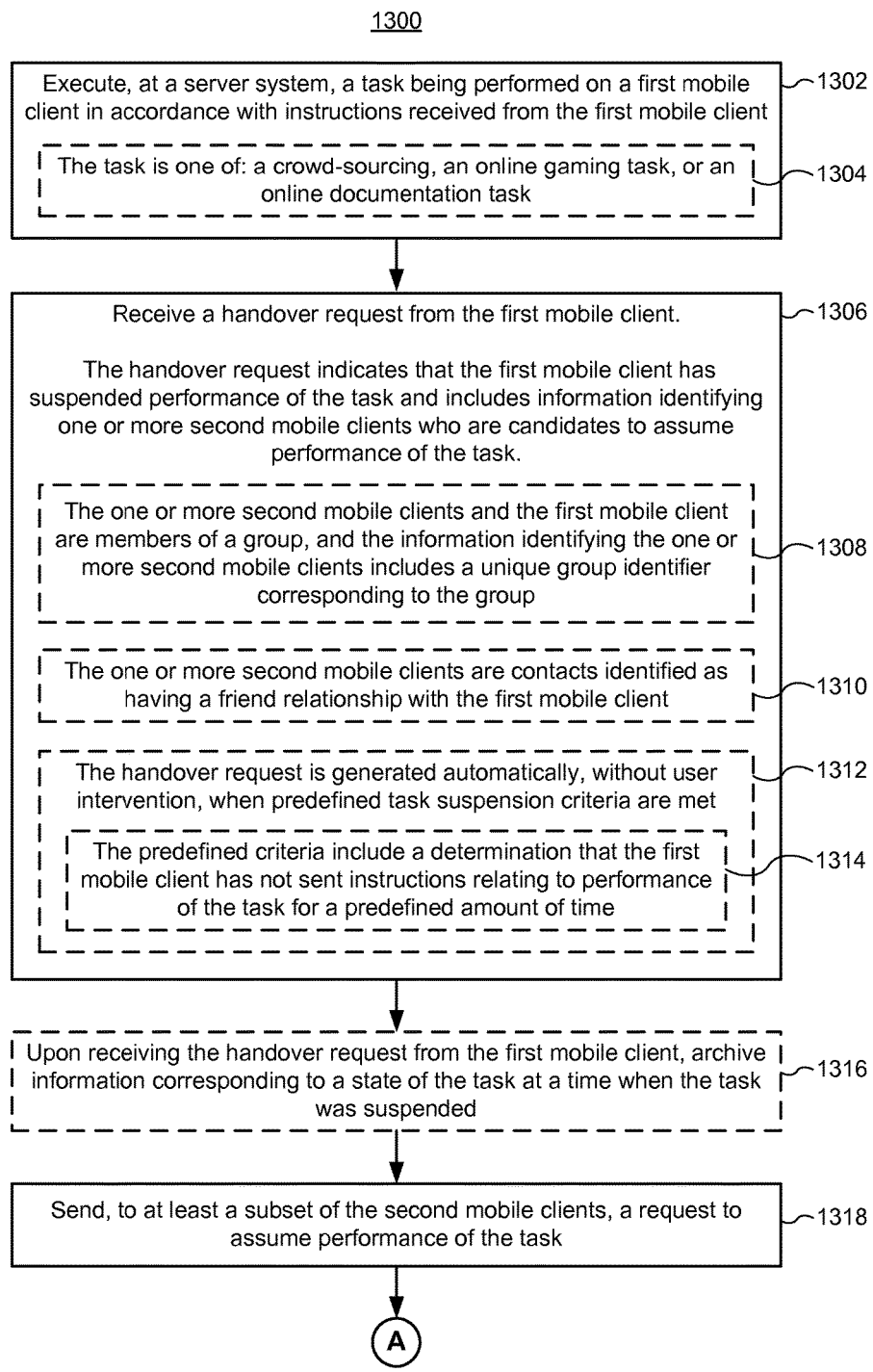
FIGS. 13A-13B include a flow chart illustrating a method of transferring task execution from one mobile client device to another mobile client device, in accordance with some embodiments.
Figure 13B:
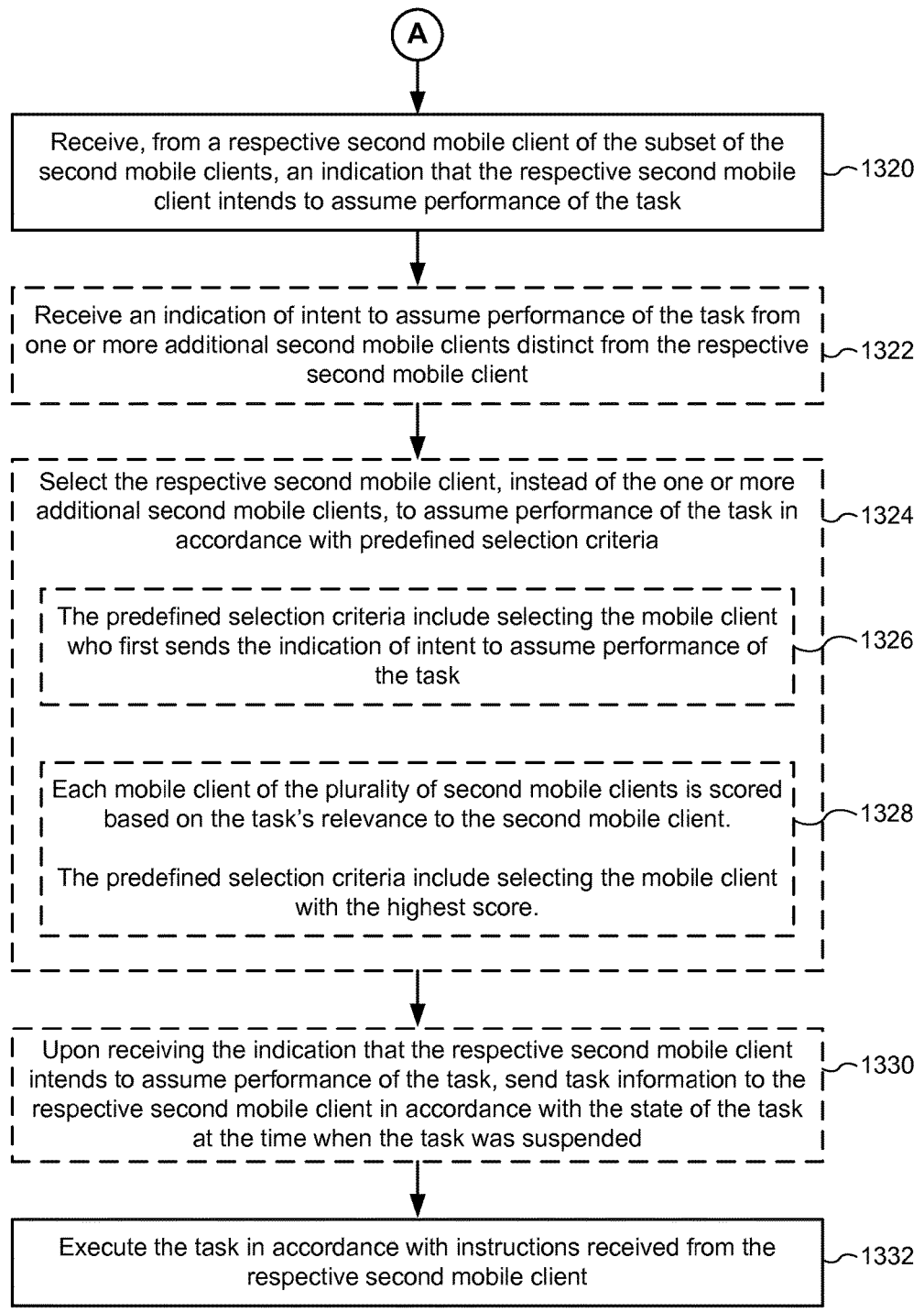

FIGS. 13A-13B include a flow chart of a method 1300 for transferring execution of a task, in accordance with some implementations. In some implementations, one or more operations in the method 1300 are performed at a portable device (e.g., client device 108/110, FIG. 1). In some implementations, one or more operations in the method 1300 are performed at a server system (e.g., server system 111, FIG. 1 and/or server system 1110, FIG. 11).

The server system executes (1302) a task being performed on a first mobile client (e.g., a respective client device 108/110) in accordance with instructions received from the first mobile client. In some embodiments, the task is (1304) one of: a crowdsourcing task, an online gaming task, or an online documentation task.

As an example an online gaming task, in some embodiments, the first mobile client device will include a mobile gaming application that will transmit instructions to the server system in accordance with the user's actions in playing the game. For example, in some embodiments, the online game is a multiplayer first person shooter game having a plurality of avatars, each representing a user of a mobile client. The mobile gaming application transmits instructions to the server system indicating the manner in which the user of the first mobile client is moving his player, shooting at other players, collecting points and rewards, etc. Alternatively, the online game is a role-playing game, a real-time strategy game, or a social game (e.g., an online puzzle or wordplay game in which case the mobile gaming application transmits, for example, the user's choice of word).

As an example of an online crowdsourcing task, the task may include an online translation task to translate a document from one language to another, or an online writing task, in which new content is produced by a group of people (e.g., including the user of the first mobile client). In some embodiments, the first mobile client runs a mobile application that synchronizes the altered content of the document with a version of the document stored on the server system (e.g., in real-time or in near real-time), so that it is available to others to view and or make additional changes. In some embodiments, the mobile application is a web application. In some embodiments, the crowdsourcing task includes development of other types of content, such as web content, musical content, etc.

As an example of an online documentation task, in some embodiments, the user of the first mobile client is an employee of a company that uses a computer environment to manage projects and/or clients (e.g., customer relationship management software). The first mobile client will run a mobile version of the computer environment to update, for example, a database stored on the server system as part of a server version of the computer environment. For example, a company may wish to canvas an area to promote their product by going door-to-door. The mobile version of the computer environment will allow the employees to report which homes have been visited and report on, e.g., their success in speaking with the residents of those homes.

The server system receives (1306) a handover request from the first mobile client. The handover request indicates that the first mobile client has suspended performance of the task (or wishes to suspend performance of the task) and includes information identifying one or more second mobile clients who are candidates to assume performance of the task. In some embodiments, the one or more second mobile clients and the first mobile client are (1308) members of a group, and the information identifying the one or more second mobile clients includes a unique group identifier corresponding to the group. For example, in some embodiments, the handover request will identify the first mobile client as a member of a group, and will further include permission information that indicates that only members of the group should be considered candidates to assume performance of the task. In some circumstances, the handover request includes a default identifier that indicates that any user can assume performance of the task.

In some embodiments, the one or more second mobile clients (1310) are contacts identified as having a friend relationship with the first mobile client. For example, when the task is an online gaming task, an inexperienced player (e.g., who is the user of the first mobile client) may be struggling with a challenging aspect of the online game. Thus, she may wish to employ the help of her friends (or teammates in the online game). The handover request will therefore indicate that the player is asking for one of her friends to take over the game.

In some embodiments, the handover request is generated (1312) automatically, without user intervention, when predefined task suspension criteria are met. For example, the predefined criteria include (1314) a determination that the first mobile client has not sent instructions relating to performance of the task for a predefined amount of time.

In some embodiments, upon receiving the handover request from the first mobile client, the server system archives (1316) information corresponding to a state of the task at a time when the task was suspended. In some embodiments, the state of the task is a "snapshot" of the task that corresponds to the progress that the first mobile client made in performing the task at the time when the first mobile client suspended the task. Continuing with the example of an online gaming task, in some embodiments, the online game is a crossword puzzle game. The server system will store information corresponding to the state of the grid, such as what words/letters have already been filled in by the user. In some embodiments, for example, when the online game is a first person shooter game in which the user has to complete a "level" without being "killed," or else has to start the level over, the state of the game (i.e., the task) is a snapshot of game at a predetermined point prior to the handover request (e.g., if the avatar of the user of the first mobile client is repeatedly slain by a respective villain in a respective level, the server system will archive information marking the state of the game at the beginning of the respective level).

The server system sends (1318), to at least a subset of the second mobile clients, a request to assume performance of the task. For example, in some embodiments, the server system sends the request to assume performance of the task to only a single mobile client of the second mobile clients. For example, the server system ranks the second mobile clients based on, e.g., their proficiency in accomplishing similar tasks (e.g., based on second mobile client user's "all-time" high score for the online game, if the task is an online gaming task), and selects the highest ranked second mobile client to send the request to. In some embodiments, when the selected second mobile client declines the request, or if the second mobile client does not respond to the request within a predetermined amount of time, the server system sends a request to assume performance of the task to the next ranked second mobile client, and so on. In some embodiments, the server system sends the request to assume performance of the task to a plurality of second mobile clients (for example, all of the identified second mobile clients).

In some embodiments, the server system includes a game server for an online game and the handover request is received by the game server from a mobile application on the first client executing the online game. Alternatively, the handover request is received by the game server from a web application executing the online game running on a browser application of the first client. In some embodiments, the request to assume performance of the task is sent using one of: an instant message, a short message service (SMS) message, a multimedia message service (MMS) message, a social networking service (SNS) message, an instant voice message, or an e-mail. That is to say, in some embodiments, the first client indicates their desire to suspend performance of the task in a first type of application ("app") and the second client receives the request to resume the task in a second type of application. FIGS. 5C-5D illustrate an example of this: in FIG. 5C, a translating task is handed over in a "Crowdsourcing Translation" application and the request to resume the translating task is received by a different user in a text messaging app (e.g., WeChat). This allows a greater number of users to be "candidates" to assume responsibility for the task by obviating the need for candidates to be "logged-into" the appropriate service/application at the time the request is sent out.

The server system receives (1320), from a respective second mobile client of the subset of the second mobile clients, an indication that the respective second mobile client intends to assume performance of the task. In some embodiments, there is a reward for the respective second mobile client associated with responding to the request to assume performance of the task by sending, to the server system, an indication of intent to assume performance of the task. In some embodiments (e.g., when the first mobile client and second mobile clients are business contractors), the reward is financial (e.g., the task is work for which the respective second mobile client will be paid). In some embodiments, the reward is social media oriented. For example, the server system will distinguish avatars or user profiles of users who have met predefined thresholds in their willingness to "jump-in" and help others. In some embodiments (e.g., continuing with the online gaming example), the reward is that the respective second mobile client will be able to accrue game points earned while taking over the task.

In some embodiments, the server system receives (1322) an indication of intent to assume performance of the task from one or more additional second mobile clients distinct from the respective second mobile client. In this case, the server system selects (1324) the respective second mobile client, instead of the one or more additional second mobile clients, to assume performance of the task in accordance with predefined selection criteria. For example, the predefined selection criteria include (1326) selecting the mobile client who first sends the indication of intent to assume performance of the task. Alternatively, each mobile client of the plurality of second mobile clients is scored (1328) based on the task's relevance to the second mobile client (e.g., using a metric such as each user's high score in an online game). The predefined selection criteria include selecting the mobile client with the highest score. In some embodiments, the server system sends a message (e.g., a text message) to the one or more additional second mobile clients informing them that they have not been selected to assume performance of the task.

In some embodiments, upon receiving the indication that the respective second mobile client intends to assume performance of the task, the server system sends (1330) task information to the respective second mobile client in accordance with the state of the task at the time when the task was suspended (cf. operation 1316).

The server system executes (1332) the task in accordance with instructions received from the respective second mobile client. In some embodiments, each player is associated with an avatar in the game and the inexperienced player's avatar will be replaced by her friend's avatar when her friend takes over. In some embodiments, this operation is analogous to operation 1302, except that it is now the second mobile client controlling the task. In some embodiments, the second mobile client will only control the task until predefined transfer-back criteria are met, such as after a predetermined amount of time has elapsed or once a predetermined number of obstacles (e.g., one level) in an online gaming task have been achieved. In some embodiments, the second mobile client assumes control of the first mobile client's avatar. In some embodiments, the second mobile client's avatar replaces the first mobile client's avatar until control is transferred back to the first mobile client.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method, comprising:
at a server system comprising one or more processors and memory:
executing a task being performed on a first mobile client in accordance with instructions received from the first mobile client;
receiving a handover request from the first mobile client, wherein the handover request indicates that the first mobile client has suspended performance of the task and includes information identifying other mobile clients who are candidates to assume performance of the task;
archiving information corresponding to a state of the task at a time when the task was suspended;
sending, to at least a subset of the other mobile clients, a request to assume performance of the task, wherein the at least subset of the other mobile clients includes a plurality of other mobile clients;
receiving, from two or more of the at least subset of the other mobile clients to whom the request to assume performance was sent, a request from the respective mobile client to receive the handover of performance of the task, wherein the two or more of the at least subset of the other mobile clients includes a second mobile client and a third mobile client;
for each respective mobile device of the two or more of the at least subset of other mobile devices from whom a request to receive the handover of performance of the task is received, scoring the respective mobile client with a task relevance score based on the task's relevance to the respective mobile client;
selecting the second mobile client, instead of the third mobile client, as the mobile client to which to handover performance of the task in accordance with predefined selection criteria, wherein the predefined selection criteria include selecting the second mobile client when the second mobile has the highest task relevance score of the two or more of the at least subset of other mobile devices from whom an indication to assume performance is received;
after selecting the second mobile client:
sending task information to the respective second mobile client in accordance with the state of the task at the time when the task was suspended; and
resuming executing the task at the state of the task at the time when the task was suspended in accordance with instructions received from the second mobile client.

2. The method of claim 1, wherein the task is one of: a crowdsourcing task, an online gaming task, or an online documentation task.

3. The method of claim 1, wherein the other mobile clients and the first mobile client are members of a group, and the information identifying the other mobile clients comprises a unique group identifier corresponding to the group.

4. The method of claim 1, wherein the other mobile clients comprise contacts identified as having a friend relationship with the first mobile client.

5. The method of claim 1, wherein the handover request is generated automatically, without user intervention, when predefined task suspension criteria are met.

6. The method of claim 5, wherein the predefined task suspension criteria include a determination that the first mobile client has not sent instructions relating to performance of the task for a predefined amount of time.

7. The method of claim 1, wherein the server system includes a game server for an online game and the handover request is received by the game server from a mobile application on the first client executing the online game.

8. The method of claim 1, wherein the request to assume performance of the task is sent using one of: an instant message, a short message service (SMS) message, a multimedia message service (MMS) message, a social networking service (SNS) message, an instant voice message, or an e-mail.

9. The method of claim 1, wherein:
executing the task in accordance with instructions received from the first mobile client includes tracking a first avatar's progress through the online game, wherein the first avatar is associated with a first user corresponding to the first mobile client; and
executing the task being performed in accordance with instructions received from the second mobile client includes tracking a second avatar's progress through the online game, wherein the second avatar is associated with a second user corresponding to the second mobile client.

10. A server system, comprising:
one or more processors;
memory; and
one or more programs, wherein the one or more programs are stored in the memory and configured to be executed by the one or more processors, the one or more programs including instructions that when executed by the one or more processors cause the server system to:
execute a task being performed on a first mobile client in accordance with instructions received from the first mobile client;
receive a handover request from the first mobile client, wherein the handover request indicates that the first mobile client has suspended performance of the task and includes information identifying other mobile clients who are candidates to assume performance of the task;
archive information corresponding to a state of the task at a time when the task was suspended;
send, to at least a subset of the other mobile clients, a request to assume performance of the task, wherein the at least subset of the other mobile clients includes a plurality of other mobile clients;
receive, from two or more of the at least subset of the other mobile clients to whom the request to assume performance was sent, a request from the respective mobile client to receive the handover of performance of the task, wherein the two or more of the at least subset of the other mobile clients includes a second mobile client and a third mobile client;
for each respective mobile device of the two or more of the at least subset of other mobile devices from whom a request to receive the handover of performance of the task is received, score the respective mobile client with a task relevance score based on the task's relevance to the respective mobile client;
select the second mobile client, instead of the third mobile client, as the mobile client to which to handover performance of the task in accordance with predefined selection criteria, wherein the predefined selection criteria include selecting the second mobile client when the second mobile has the highest task relevance score of the two or more of the at least subset of other mobile devices from whom an indication to assume performance is received;

after selecting the second mobile client:
  send task information to the respective second mobile client in accordance with the state of the task at the time when the task was suspended; and
  resume executing the task at the state of the task at the time when the task was suspended in accordance with instructions received from the second mobile client.

11. The server system of claim 10, wherein the handover request is generated automatically, without user intervention, when predefined task suspension criteria are met.

12. The server system of claim 10, wherein the server system includes a game server for an online game and the handover request is received by the game server from a mobile application on the first client executing the online game.

13. The server system of claim 10, wherein:
  executing the task in accordance with instructions received from the first mobile client includes tracking a first avatar's progress through the online game, wherein the first avatar is associated with a first user corresponding to the first mobile client; and
  executing the task being performed in accordance with instructions received from the second mobile client includes tracking a second avatar's progress through the online game, wherein the second avatar is associated with a second user corresponding to the second mobile client.

14. A non-transitory computer readable storage medium storing one or more programs, the one or more programs comprising instructions, which when executed by a server system with one or more processors and memory, cause the server system to:
  execute a task being performed on a first mobile client in accordance with instructions received from the first mobile client;
  receive a handover request from the first mobile client, wherein the handover request indicates that the first mobile client has suspended performance of the task and includes information identifying other mobile clients who are candidates to assume performance of the task;
  archive information corresponding to a state of the task at a time when the task was suspended;
  send, to at least a subset of the other mobile clients, a request to assume performance of the task, wherein the at least subset of the other mobile clients includes a plurality of other mobile clients;
  receive, from two or more of the at least subset of the other mobile clients to whom the request to assume performance was sent, a request from the respective mobile client to receive the handover of performance of the task, wherein the two or more of the at least subset of the other mobile clients includes a second mobile client and a third mobile client;
  for each respective mobile device of the two or more of the at least subset of other mobile devices from whom a request to receive the handover of performance of the task is received, score the respective mobile client with a task relevance score based on the task's relevance to the respective mobile client;
  select the second mobile client, instead of the third mobile client, as the mobile client to which to handover performance of the task in accordance with predefined selection criteria, wherein the predefined selection criteria include selecting the second mobile client when the second mobile has the highest task relevance score of the two or more of the at least subset of other mobile devices from whom an indication to assume performance is received;
  after selecting the second mobile client:
    send task information to the respective second mobile client in accordance with the state of the task at the time when the task was suspended; and
    resume executing the task at the state of the task at the time when the task was suspended in accordance with instructions received from the second mobile client.

* * * * *